US012587521B1

(12) United States Patent
Dixon et al.

(10) Patent No.: US 12,587,521 B1
(45) Date of Patent: Mar. 24, 2026

(54) ONLINE ACCOUNT AUTHENTICATION AND ANTI-FRAUD SYSTEM AND METHOD

(71) Applicant: United Services Automobile Association (USAA), San Antonio, TX (US)

(72) Inventors: David Patrick Dixon, Boeme, TX (US); Ashley Raine Philbrick, San Antonio, TX (US); Surender Kumar, Palatine, IL (US); Megan Sarah Jennings, San Antonio, TX (US); Salvador Adrian Bretado, San Antonio, TX (US); Brian Tougas, Spring Branch, TX (US); Arthur Quentin Smith, Fredericksburg, TX (US); Jennifer Anne Scamardo, Frisco, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 18/234,228

(22) Filed: Aug. 15, 2023

Related U.S. Application Data

(60) Provisional application No. 63/398,106, filed on Aug. 15, 2022.

(51) Int. Cl.
*H04L 29/06* (2006.01)
*G06Q 50/26* (2012.01)
*H04L 9/40* (2022.01)

(52) U.S. Cl.
CPC ......... *H04L 63/083* (2013.01); *G06Q 50/265* (2013.01); *H04L 63/102* (2013.01); *H04L 63/1491* (2013.01)

(58) Field of Classification Search
CPC . H04L 63/083; H04L 63/102; H04L 63/1491; G06Q 50/265
See application file for complete search history.

(56) References Cited

U.S. PATENT DOCUMENTS

| | | | | | |
|---|---|---|---|---|---|
| 10,834,104 | B1 * | 11/2020 | Comeaux | ................. | G06N 5/01 |
| 11,019,090 | B1 * | 5/2021 | Smith | ..................... | G06F 21/40 |
| 11,315,119 | B1 * | 4/2022 | Hendry | ................. | G06Q 40/02 |

* cited by examiner

*Primary Examiner* — Wasika Nipa
(74) *Attorney, Agent, or Firm* — Fletcher Yoder, PC

(57) ABSTRACT
A method employs processing circuitry for various steps. The steps include receiving, from a user device, authentication data in association with an online account of a number of online accounts, and locating, in a database system storing customer profiles corresponding the online accounts and based on the authentication data, a customer profile corresponding to the online account. The steps include determining a correspondence between the authentication data and reference authentication data in the customer profile, and locating authentication data in the customer profile based on determining the correspondence. The steps include locating, in the database system storing alias customer profiles corresponding to the customer profiles and based on the alias authentication data, an alias customer profile corresponding to the customer profile. The steps include locating, in the alias customer profile, reference alias authentication data, and determining an additional correspondence between the alias authentication data and the reference alias authentication data.

12 Claims, 3 Drawing Sheets

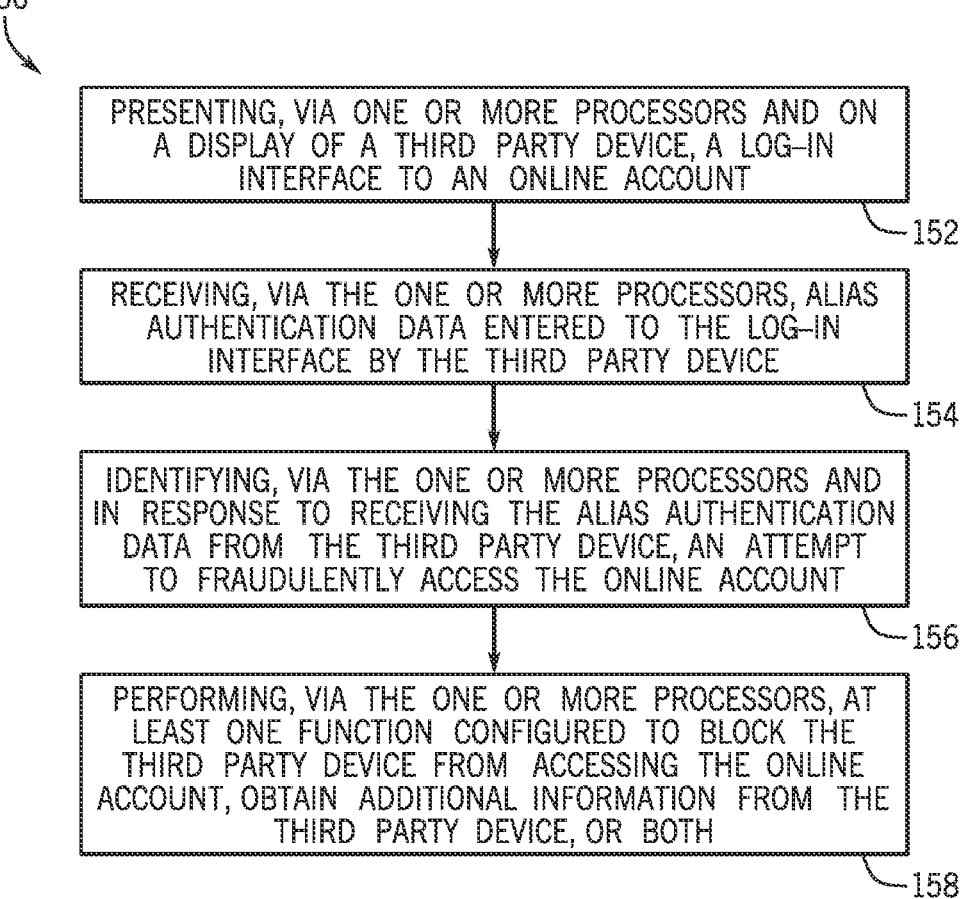

150

PRESENTING, VIA ONE OR MORE PROCESSORS AND ON
A DISPLAY OF A THIRD PARTY DEVICE, A LOG-IN
INTERFACE TO AN ONLINE ACCOUNT

152

RECEIVING, VIA THE ONE OR MORE PROCESSORS, ALIAS
AUTHENTICATION DATA ENTERED TO THE LOG-IN
INTERFACE BY THE THIRD PARTY DEVICE

154

IDENTIFYING, VIA THE ONE OR MORE PROCESSORS AND
IN RESPONSE TO RECEIVING THE ALIAS AUTHENTICATION
DATA FROM THE THIRD PARTY DEVICE, AN ATTEMPT
TO FRAUDULENTLY ACCESS THE ONLINE ACCOUNT

156

PERFORMING, VIA THE ONE OR MORE PROCESSORS, AT
LEAST ONE FUNCTION CONFIGURED TO BLOCK THE
THIRD PARTY DEVICE FROM ACCESSING THE ONLINE
ACCOUNT, OBTAIN ADDITIONAL INFORMATION FROM THE
THIRD PARTY DEVICE, OR BOTH

ONLINE ACCOUNT AUTHENTICATION AND ANTI-FRAUD SYSTEM AND METHOD

CROSS-REFERENCE TO RELATED APPLICATIONS

The present application claims priority to and the benefit of U.S. Provisional Application No. 63/398,106, entitled "ONLINE ACCOUNT AUTHENTICATION AND ANTI-FRAUD SYSTEM AND METHOD," filed on Aug. 15, 2022, the disclosure of which is incorporated by reference herein in its entirety for all purposes

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admission of prior art.

User authentication (alternatively referred to as user verification) for accessing online services (e.g., online accounts) of a business may involve a business server prompting a user to enter, via a user device, various authentication data. For example, the user may enter authentication data including an online account username, an online account password, a code such as a personal identification number (PIN), an answer to an authentication question corresponding to the online account, biometric data (e.g., face, fingerprint, voice signature etc.), asking the user to enter a randomly generated one-time passcode valid for a limited time and sent via SMS to a smartphone device associated with the account and the like. The business server may receive the entered authentication data from the user device, and compare at least some of the entered authentication data with reference authentication data corresponding to the online account. For example, the business server may locate a customer profile corresponding to the online account based on the entered online account username matching or otherwise corresponding to a reference online account username. Further, the business server may determine whether the entered online account password (and/or the entered answer to the authentication question) matches or otherwise corresponds to a reference online account password (and/or a reference answer to the authentication question) in the customer profile. In response to the above-described matching or correspondence, the business server may authenticate (or verify) the user and allow the user device to access the online account.

Unfortunately, in traditional embodiments, a third party (e.g., unrecognized device, unrecognized user, a fixed IP address known and considered a threat, or device known and considered a threat) may intercept or otherwise obtain the entered or reference authentication data, which the third party may use to fraudulently access the online account. In certain circumstances, the third party may use the entered or reference authentication data to access other online accounts of the user (e.g., if the other online accounts of the user include the same or similar username(s), password(s), and/or answer(s) to authentication questions). Accordingly, it is now recognized that improved authentication (or verification) for online services (e.g., online accounts) is desired.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment of the present disclosure, a computer-implemented method employs processing circuitry for various steps of the method. A method employs processing circuitry for various steps. The steps include receiving, from a user device, authentication data in association with an online account of a number of online accounts, and locating, in a database system storing customer profiles corresponding the online accounts and based on the authentication data, a customer profile corresponding to the online account. The steps include determining a correspondence between the authentication data and reference authentication data in the customer profile, and locating authentication data in the customer profile based on determining the correspondence. The steps include locating, in the database system storing alias customer profiles corresponding to the customer profiles and based on the alias authentication data, an alias customer profile corresponding to the customer profile. The steps include locating, in the alias customer profile, reference alias authentication data, and determining an additional correspondence between the alias authentication data and the reference alias authentication data, and granting the user device access to the online account based on determining the additional correspondence.

In another embodiment of the present disclosure, a system includes a first database storing a number of customer profiles corresponding to online accounts, a second database alias customer profiles corresponding to the customer profiles, first processing circuitry, and second processing circuitry. The first processing circuitry is configured to receive authentication data in association with an online account of the online accounts, the authentication data including first data indicative of an online account username and second data indicative of an online account password or an answer to an online account authentication question. The first processing circuitry is also configured to locate, in the first database and based on the first data, a customer profile of the customer profiles, locate, in the customer profile, third data indicative of a reference online account password or a reference answer to the online account authentication question, and determine a correspondence between the second data and the third data. The first processing circuitry is also configured to locate, in the customer profile and in response to determining the correspondence, alias authentication data including an alias online account username and an alias online account password or an alias answer to the online account authentication question. The second processing circuitry is configured to receive the alias authentication data from the first processing circuitry, locate, in the second database and based on the alias online account username, an alias customer profile of the plurality of alias customer profiles, the alias customer profile corresponding to the customer profile, and locate, in the alias customer profile, a reference alias online account password or a reference alias answer to the online account authentication question. The second processing circuitry is also configured to determine an additional correspondence between (1) the alias online account password or the alias answer, and (2) the reference alias online account password or the reference alias answer.

In still another embodiment of the present disclosure, one or more tangible, non-transitory, computer-readable media store instructions thereon that, when executed by one or more processors, are configured to cause the one or more processors to perform various functions. The functions include receiving, from an electronic device, authentication data including first data indicative of an online account username and second data indicative of an online account password or an answer to an online account authentication question. The functions also include locating, in a first database and based on the first data, a customer profile corresponding to the online account. The functions also include locating, in the customer profile, third data indicative of a reference online account password or a reference answer to the online account authentication question. The functions also include determining a correspondence between the second data and the third data, and locating, in the customer profile and in response to determining the correspondence, alias authentication data including an alias online account username and alias online account password or an alias answer to the online account authentication question. The functions also include locating, in a second database and based on the alias online account username, an alias customer profile corresponding to the customer profile. The functions also include locating, in the alias customer profile, a reference alias online account password or a reference alias answer to the online account authentication question, and determining an additional correspondence between the alias online account password and the reference alias online account password, or between the alias answer and the reference alias answer. The functions also include authenticating the electronic device in response to determining the additional correspondence.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 3 is a process flow diagram illustrating a method of utilizing the system of FIG. 1 to obtain information regarding a third party in response to the third party attempting to fraudulently access an online service (e.g., an online account), in accordance with embodiments described herein;

DETAILED DESCRIPTION

Figure 1:
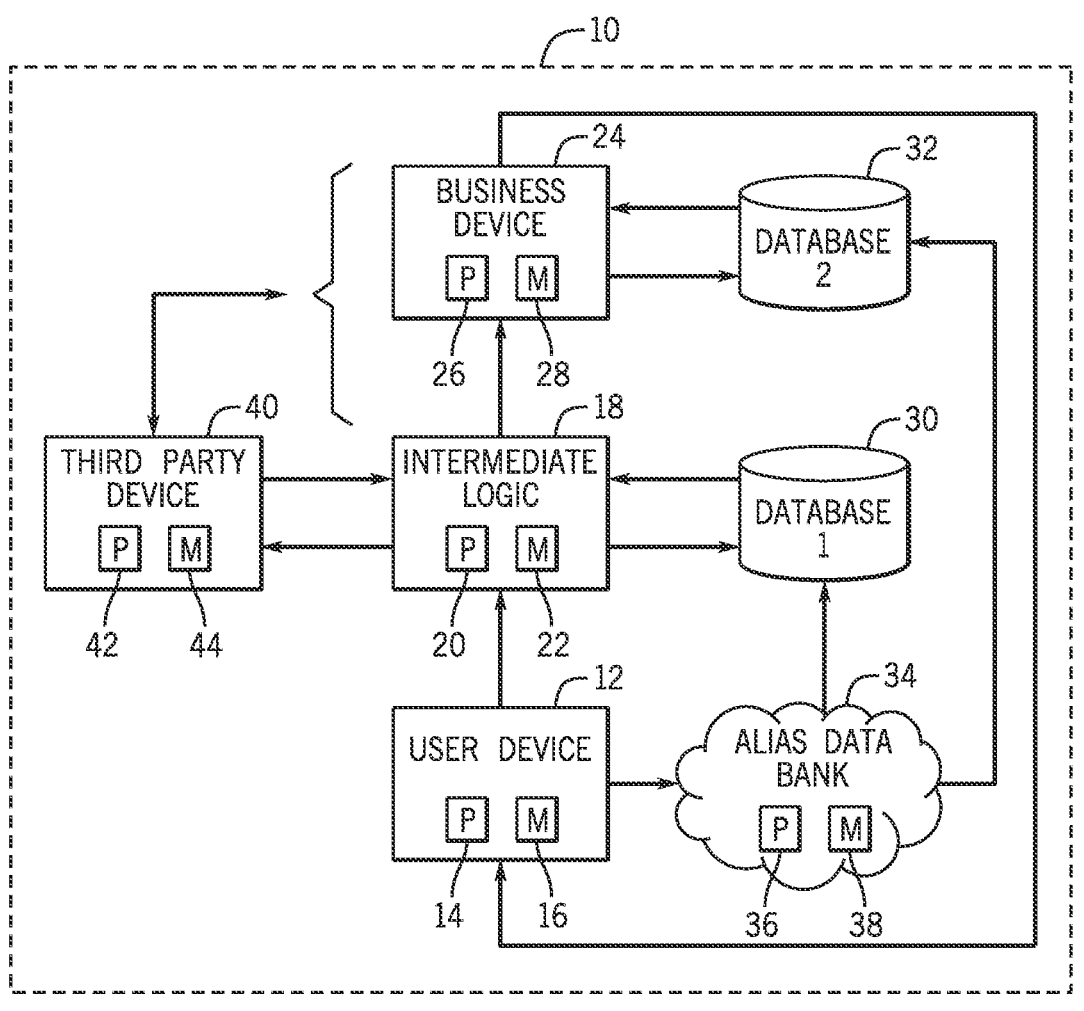
FIG. 1 is a block diagram of a system configured to authenticate a user of an online service (e.g., an online account) and/or obtain information regarding a third party attempting to fraudulently access the online service (e.g., the online account), in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure is directed toward systems and methods employed to authenticate (alternatively referred to as "verify") users requesting access to an online service (e.g., an online account) and/or detect attempts to fraudulently access the online service. More specifically, the present disclosure is directed toward leveraging alias authentication data for authenticating users of online services and/or detecting attempts of third parties to fraudulently access the online services.

In accordance with embodiments of the present disclosure, a system includes a user device, an organization (e.g., business, government entity, charity, etc.) device (e.g., webserver, processing circuitry, processor, etc.), at least one database, and intermediate logic (e.g., intermediate server, processing circuitry, processor, software, etc.). The intermediate logic may be, for example, an intermediate device communicatively coupled with the user device, the organization device, or both. It should be understood, as mentioned above, that the organization can be any entity business, government, private university, nonprofit, non-government organization (NGO) etc., but for the purpose of illustration of embodiments the business will be used hereafter. Additionally or alternatively, the intermediate logic may be software instructions employed at the user device, the business device, or some other device of the system. A log-in or authentication interface may be presented on the user device, for example, via the business device, the intermediate logic, or both. The log-in interface may prompt a user of the user device to enter various authentication data, such as an online account username, an online account password, a code, a one-time passcode, an answer to an authentication question corresponding to the online account, fixed IP address, other authentication data and the like. In some embodiments, the authentication data may additionally or alternatively include biometric information (e.g., detected by a sensor).

The intermediate logic may be employed to retrieve or search for, based on the entered authentication data, reference authentication data in a first database of the system. For example, the intermediate logic may locate, based on a match or correspondence between the entered online account username and a reference online account username, a customer profile corresponding to the online account. Further, the intermediate logic may determine whether the entered online account password, code, a onetime passcode, or other identification data matches or otherwise corresponds to a reference online account password stored in the customer profile, and/or whether the entered answer to the authentication question corresponding to the online account matches or otherwise corresponds to a reference answer to the authentication question stored in the customer profile (e.g., using methods known to those familiar with the art of authentication).

In response to determining the above-described matching (or correspondence) between the entered authentication data and the reference authentication data stored in the customer profile, the intermediate logic may employ alias authentication data. For example, the customer profile may include an alias online account username, an alias online account password, an alias answer to the authentication question, alias biometric data, or any combination thereof (including biometric information). The business device may receive the alias authentication data, for example, by way of the intermediate logic. The business device may search a second database (or another segment of the first database) to locate reference alias authentication data matching or otherwise corresponding to the alias authentication data received by way of the intermediate logic. For example, the second database may include an alias customer profile corresponding to the customer profile stored in the first database. Indeed, the alias customer profile stored on the second database may be identified via the business device by comparing the alias online account username (e.g., received by way of the intermediate logic) with the reference alias online account username in the alias customer profile.

In response to determining a match (or correspondence) between the alias authentication data received by way of the intermediate logic and the reference alias customer profile stored in the second database, the business device may authenticate (or verify) the user device, or otherwise approve an authentication request. That is, the business device may permit the user device to access the online account based on the alias user-id and the alias password. In some embodiments, the business device may permit the user device to access the online account via intermediate communication by way of the intermediate device. For example, the business device may communicate approval of the authentication request to the intermediate logic, and the intermediate logic may permit the user device to access the online account.

Further to the above-described features, the alias authentication data and/or the reference alias authentication data (collectively or individually referred to herein as "alias data") may appear to be authentic to a third party (unrecognized device whether missing a cookie, or unrecognized IP address, etc.) attempting to fraudulently access the online account of another user (the would be victim). As an example, the authentication question corresponding to the online account may include "what is the name of your oldest sibling." The reference answer to the authentication question may be "Michael," which corresponds to the name of the user's oldest sibling, and the alias answer may be "Thomas," which corresponds to the name of the user's youngest sibling. To a third party with limited or incomprehensive knowledge of the user, the alias answer may appear to be authentic.

Accordingly, a third party that intercepts or otherwise obtains the alias data may attempt to employ the alias data to request access to the user account. That is, the third party may transmit, via a log-in interface presented on a display of a third party device of the third party, the alias data to the intermediate logic, the business device, or both. In response to receiving the alias data from the third party device, the intermediate logic, the business device, or both may detect an attempt to fraudulently access the online account corresponding to the alias data (e.g., by determining that the data received from the third party device matches or otherwise corresponds to the alias data stored in a customer profile). Indeed, in a legitimate attempt to access the online account, neither the intermediate logic nor the business device would receive the alias data from the third party device. Other mechanisms for detecting a fraudulent attempt to access an online account include detecting a third party device communicating directly with the business device, as typically online access attempts would be received by the intermediate logic. In some embodiments, detecting the attempt to fraudulently access the online account may additionally include determining an IP address associated with the third party device attempting to fraudulently access the online account, and determining whether the IP address of the third party device differs from a reference IP addresses corresponding to the intermediate logic and/or stored in the customer profile and indicative of the user device generally employed by the user.

After detecting an attempt by the third party device to fraudulently access the online account (e.g., via provision of incorrect authentication data, namely, alias data instead of true authentication data), the intermediate logic, the business device, or both may perform various functions that enable the system to identify information regarding the third party device. For example, the system may log the IP address and/or other information of the third party device. In some embodiments, the system may permit the third party device to access a false (or shadow) account that appears to be authentic, and leverage the access to the false (or shadow) account to obtain additional information regarding the third party device and/or the third party operating the third party device. As an example, the system may prompt the third party user of the third party device to activate a camera of the third party device, a microphone of the third party device. answer a security question in a video or audio session with the goal to capture the face or audio signature of the third party user (fraudster) or the like. Additionally or alternatively, the system may prompt the third party user to complete a survey via the third party device, where the survey is employed to obtain additional information regarding the third party. The system may load a monitoring and/or tracking app (virus) on to the third party device. In general, presently disclosed systems and methods improve authentication (or verification) of users attempting to access online accounts (e.g., online accounts) over traditional embodiments, and may improve detection and/or analysis of attempts to fraudulently access online accounts over traditional embodiments. These and other features will be described in detail below with reference to the drawings.

Turning now to the drawings, FIG. 1 is a block diagram of an embodiment of a system 10 configured to authenticate a user of an online service (e.g., an online account) and/or obtain information regarding a third party attempting to fraudulently access the online service (e.g., the online account). In the illustrated embodiment, the system 10 includes a user device 12 having processing circuitry 14 (e.g., one or more processors) and memory circuitry 16 (e.g., one or more memory devices), intermediate logic 18 (e.g., server, processing circuitry, processor, software, etc.), and a business device 24 having processing circuitry 26 and memory circuitry 28. In the illustrated embodiment, the intermediate logic 18 is illustrated as a device having processing circuitry 20 and memory circuitry 22. However, in another embodiment, the intermediate logic 18 may be software instructions (e.g., employed at the user device 12, the business device 24, or some other device in the system 10). The system 10 also includes a first database 30 and a second database 32. In some embodiments, the first database 30 and the second database 32 may be combined in a single database. For example, a single database having a first database portion (e.g., corresponding to the first database 30) and a second database portion (e.g., corresponding to the second database 32). In this way, it should be understood that "the first database 30" as used herein may refer to a first database portion of a single database, and "the second database 32" as used herein may refer to a second database portion of the single database.

At least the business device 24, the first database 30, and the second database 32 of the system 10 may be employed by (e.g., owned and/or operated by) a business to provide online services. For example, the business may employ the business device 24, the first database 30, and the second database 32 to enable customers to open online accounts with the business, to store customer account data, to authenticate (or verify) a user attempting to access an online account, and/or to identify third parties attempting to fraudulently access an online account. In some embodiments, the intermediate logic 18 may also be employed by the business. For example, the intermediate logic 18 and/or the business device 24 may present an authentication interface on a display of the user device 12, and the authentication interface may prompt the user to enter authentication data corresponding to an online account associated with the business. For example, a user of the user device 12 may enter authentication data including an online account username, an online account password, an answer to an authentication question corresponding to the online account, and the like.

The intermediate logic 18 may be employed to query the first database 30 based on the entered authentication data (and, in some embodiments, an IP address associated with the user device 12, a geographic location of the device 12, etc.). For example, the intermediate logic 18 may be employed to locate the online account in response to a match or correspondence between the entered online account username and a reference online account username included in a customer profile stored to the first database 30. After locating the online account as described above (and the corresponding customer profile), the intermediate logic 18 may be employed to compare the entered online account password, code and/or the entered answer to the authentication question with a reference online account password in the customer profile and/or a reference answer to the authentication question in the customer profile.

In response to determining a match or correspondence between the entered online account password and the reference online account password (and/or between the entered authentication answer and the reference authentication answer), the intermediate logic 18 may be employed to locate alias authentication data in the customer profile stored to the first database 30. For example, the alias authentication data may include an alias online account username, an alias online account password, an alias authentication answer, or any combination thereof. In general, the first database 30 may include all or some of the above-described reference authentication data and alias authentication data indexed thereon for each customer profile. That is, for a particular customer, the first database 30 may include a particular customer profile having data indicative of the reference online account username, the reference online account password, the reference authentication answer, the alias online account username, the alias online account password, and/or the alias authentication answer.

In response to identifying or locating the above-described alias authentication data, the intermediate logic 18 may be employed to transmit at least a portion of the alias authentication data to the business device 24. In some embodiments, the business device 24 may additionally receive an authentication request from the user device 12. In response to receiving the alias authentication data (e.g., via the intermediate logic 18), the business device 24 may query the second database 32 in an effort to authenticate the user device 12. For example, the second database 32 may include reference alias authentication data stored in an alias customer profile corresponding to the customer profile, against which the alias authentication data received via the intermediate logic 18 is compared. In some embodiments, the second database 32 does not include the reference authentication data (i.e., the second database 32 may include the reference alias authentication data and not the reference authentication data). Accordingly, in response to receiving the alias authentication data via the intermediate logic 18, the business device 24 may easily locate, in the second database 32, the alias customer profile and compare the alias authentication data (e.g., received by way of the intermediate logic 18) with the reference alias authentication data corresponding to the alias customer profile stored on the second database 32. It should be noted that the alias authentication data and the reference alias authentication data may be referred to collectively or individually as "alias data."

In response to the alias authentication data matching (or otherwise corresponding to) the reference alias authentication data in the alias customer profile, the business device 24 may approve the authentication request and permit the user device 12 to access the customer account. Additionally or alternatively, the intermediate logic 18 may approve the authentication request and permit the user device 12 to access the customer account. Indeed, in certain embodiments, the intermediate logic 18 may approve the authentication request after receiving instructions to do so from the business device 24.

In accordance with the present disclosure, the alias data described above (e.g., the alias authentication data and the reference alias authentication data) may include words, phrases, and the like that appear to be authentic. For example, the alias data may include a word having a dictionary definition, a proper noun (e.g., "Mexico"), a traditional name (e.g., "John," "Jane," etc.), or the like. In some embodiments, the alias data may be selected via the user device 12 (or some other device of the user) at the time the online account is created. Additionally or alternatively, the alias data may be generated by the intermediate logic 18, the business device 24, or both at the time the online account is created. Additionally or alternatively, the alias data may be changed (e.g., by the user device 12, the intermediate logic 18, and/or the business device 24) during a lifetime of the customer account.

In the illustrated embodiment, the system 10 includes an alias data bank 34 having processing circuitry 36 and memory circuitry 38. The alias data bank 34 may be employed to select the alias data, for example, at the time the customer opens the customer account (e.g., via the user device 12). In some embodiments, the alias data bank 34 may limit the types of words that can be selected as the alias data. For example, the alias data bank 34 may limit the types of words that can be selected as the alias data to those words that have dictionary definitions, are proper nouns, and/or are traditional names. In some embodiments, the types of words that can be selected as the alias data may additionally or alternatively be based on the user (or "customer") opening the customer account. For example, as previously described, an authentication question may include "what is the name of your oldest sibling." The reference answer to the authentication may be "Michael," which corresponds to the name of the user's oldest sibling, and the alias data bank 34 may limit the possible alias answers to those corresponding to other siblings of the user, such as "Thomas" and "Mary."

In some embodiments, before selection of the alias data, an aspect of the system 10 (e.g., the intermediate logic 18, the business device 24, the alias data bank 34, etc.) may prompt the user to complete a survey (or other data gathering method, e.g., using "contact" information from a smart phone) via the user device 12, where the survey is employed by the alias data bank 34 to limit the available alias data options selectable for protecting the customer account. The survey could also restrict alias data to the data gathered in the survey. The survey may include, as suggested above, a question regarding the names and ages of all the siblings of the user. Other questions are also possible, such as locations and dates of various residencies of the user. Further still, in some embodiments, the alias data bank 34 (or some other device in the system 10) may scan social media profiles of the user or other data sources to limit options for alias data selected by the system 10 and/or the user of the user device 12. After selection, the alias data, as described above, may be stored in the customer profile on the first database 30 (e.g., the alias authentication data) and in the alias customer profile on the second database 32 (e.g., the reference alias authentication data).

In certain circumstances, a third party (e.g., via a third party device 40 having processing circuitry 42 and memory circuitry 44) may fraudulently intercept or otherwise fraudulently obtain the alias data. For example, the third party device 40 may obtain the alias data from any componentry of the system 10, such as from the intermediate logic 18, the first database 30, the business device 24, the second database 32, and/or any wired or wireless communication paths therebetween. Other points of data interception by the third party device 40 are also possible, including those in the illustrated system 10 and outside of the illustrated system 10. As previously described, the alias data may include words having dictionary definitions, proper nouns, names, and the like that may appear to be authentic to the third party operating the third party device 40. Accordingly, the third party operating the third party device 40 may utilize the fraudulently obtained alias authentication data and/or reference alias authentication data in an attempt to access the corresponding online account. Other types of data that may flag a fraudulent attempt to access an online account include mixed data (e.g., partial authentic data and partial alias data).

For example, the third party may transmit, via a log-in interface presented on a display of the third party device 40, the alias data to the intermediate logic 18, the business device 24, or both. In response to receiving the alias data from the third party device 40, the intermediate logic 18, the business device 24, or both may detect an attempt to fraudulently access the online account corresponding to the alias data. For example, the intermediate logic 18 may recognize that the data received from the third party device 40 matches or otherwise corresponds to the pre-defined alias data stored in the customer profile on the first database 30. Likewise, business device 24 may detect potential fraudulent access because of incorrect information even if it does not match alias data. Indeed, in a legitimate attempt to access the online account, neither the intermediate logic 18 nor the business device 24 would receive the alias data from the third party device 40. In some embodiments, attempts to fraudulently access an online account may be based at least in part on receiving an IP address associated with the third party device 40, and determining whether the IP address deviates from an IP address stored to the customer profile and corresponding to the user device 12 of the user. In response to identifying an illegitimate attempt by the third party device 40 to gain access to the online account as described above, the intermediate logic 18, the business device 24, or both may perform various actions to block such access and/or identify information regarding the third party device 40 or the third party operator of the third party device 40.

For example, the intermediate logic 18 and/or the business device 24 may block the IP address associated with the third party device 40 from accessing any legitimate online accounts associated with the business. Additionally or alternatively, the intermediate logic 18 and/or the business device 24 may leverage the third party's belief in the authenticity of the alias data to gain additional information regarding the third party or the corresponding third party device 40. For example, in an embodiment, the intermediate logic 18 and/or the business device 24 may permit the third party device 40 to access a false (or shadow) account that is employed to gain additional information regarding the third party or corresponding third party device 40. Indeed, the false (or shadow) account may be employed to solicit information regarding the third party or corresponding third party device 40 (e.g., bank information, location, personal identifying information, etc.), to prompt the third party to activate a camera or microphone corresponding to the third party device 40, answer a security question in a recorded video or audio session with the goal to capture the face or audio signature of the third party user (fraudster) and the like. In some embodiments, the system 10 may prompt the third party to complete a survey (or other methods like image identification) via the third party device 40, in which the above-described information and/or other information may be received from the third party device 40. The above-described authentication (or verification) steps, including the use of alias data that appears to be legitimate to a third party, may combat fraudulent access to online accounts and enable businesses to obtain important information regarding those attempting to fraudulently access online accounts. These and other features are described in further detail below with reference to FIGS. 2 and 3.

Figure 2:
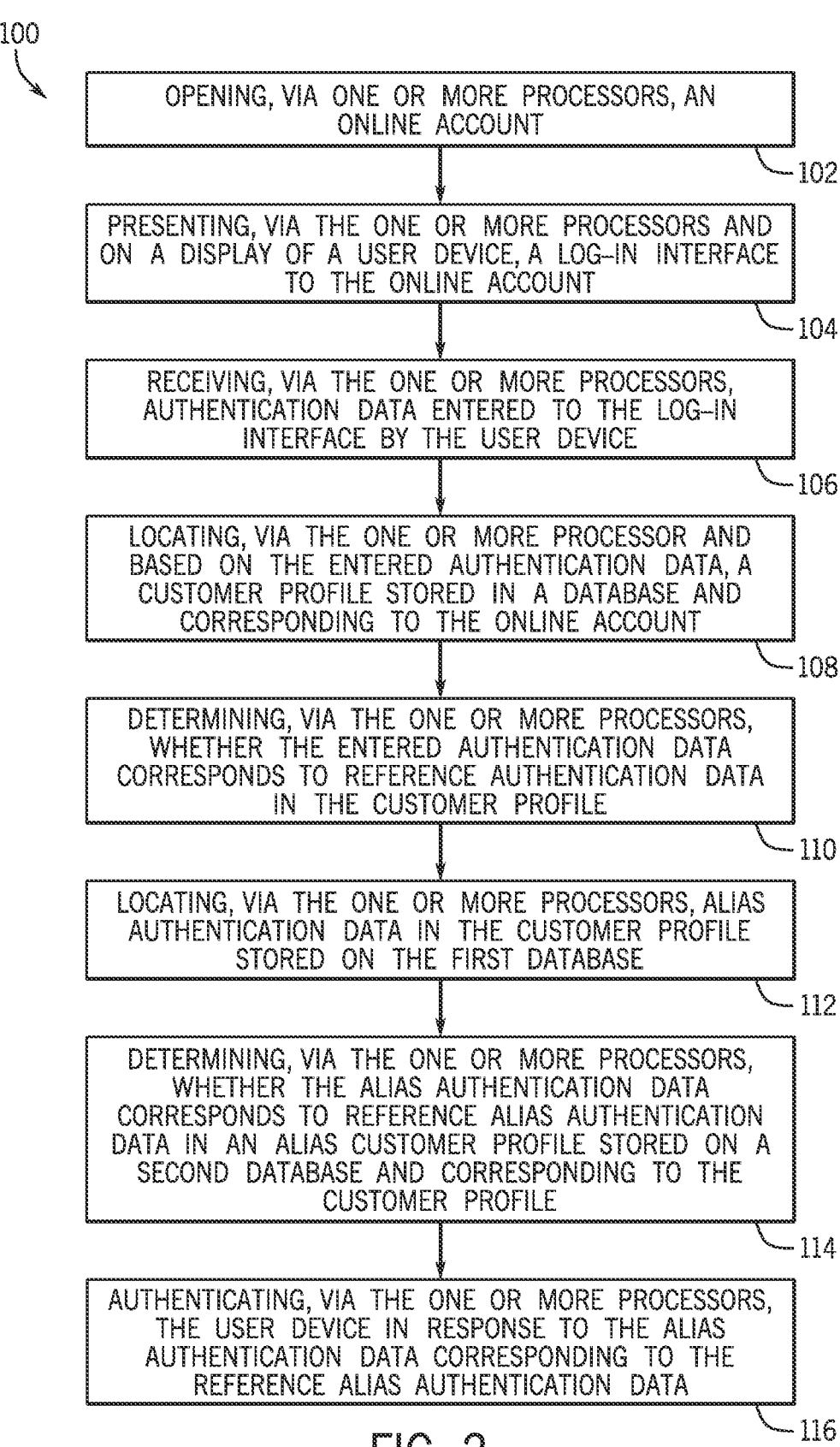
FIG. 2 is a process flow diagram illustrating a method of utilizing the system of FIG. 1 to authenticate a user of an online service (e.g., an online account), in accordance with embodiments described herein.

FIG. 2 is a process flow diagram illustrating an embodiment of a method 100 of employing the system 10 of FIG. 1 to authenticate (or verify) a user of an online service (e.g., an online account). In the illustrated embodiment, the method 100 includes opening (block 102), via one or more processors, an online account corresponding to a user (e.g., a customer). For example, various reference authentication data and/or alias data may be assigned or selected at the time the online account is opened. The reference authentication data may include, for example, an online account username, an online account password, and an answer to an authentication question corresponding to the online account. The reference authentication data, upon assignment or selection, may be saved in a customer profile stored to a database.

As previously described, alias data may also be assigned or selected. For example, the user (e.g., corresponding to the online account) and/or the business (e.g., corresponding to the online services having the online account) may select an alias online account username, an alias online account password, and/or an alias answer to the authentication question. Additionally or alternatively, alias data may be changed over pre-defined periods of time (e.g., in cycles). In some embodiments, the types of words, phrases, or the like selectable for the alias data may be limited. For example, the alias data may be limited to words having dictionary definitions, proper nouns, traditional names, or the like. In essence, the alias data is intended to appear authentic to a third party (e.g., as opposed to randomized data, such as randomized strings of letters, numbers, punctuation, etc.). The reasons for limiting the alias data as described above will be provided in detail below with reference to later steps of the method 100 and later drawings.

The method 100 also includes presenting (block 104), via the one or more processors and on a display of a user device of the user (e.g., the customer), a log-in interface to the online account. Further, the method 100 also includes receiving (block 106), via the one or more processors, authentication data entered to the log-in interface by the user device. For example, the user may enter, to the log-in interface, an online account username, an online account password, and/or an answer to an authentication question corresponding to the online account, as previously described.

The method 100 also includes locating (block 108), via the one or more processors and based on the entered authentication data, a customer profile stored in a database and corresponding to the online account. For example, the customer profile may be located in the database by determining a match or correspondence between the online account username entered by the user and a reference online account username stored in the customer profile. The method 100 also includes determining (block 110), via the one or more processors, whether the entered authentication data corresponds to reference authentication data in the customer profile. For example, after locating the customer profile, the entered authentication data from the user device may be compared with the reference authentication data in the customer profile.

The method 100 also includes locating (block 112), via the one or more processors, alias authentication data in the customer profile stored on the first database. For example, the alias authentication data may include an alias online account username, an alias online account password, an alias answer to the authentication question, or any combination thereof. The method 100 also includes determining (block 114), via the one or more processors, whether the alias authentication data corresponds to reference alias authentication data in an alias customer profile stored on a second database and corresponding to the customer profile.

For example, in some embodiments, the alias authentication data saved to the customer profile in the first database may be transmitted from a first device (e.g., having a first processor) to a second device (e.g., having a second processor). The second device may locate the alias customer profile in the second database by determining a match (or correspondence) between the alias online account username received from the first device and a reference alias online account username stored in the alias customer profile. Block 114 may also include determining, via the second device, whether the alias online account password received from the first device matches or otherwise corresponds to the reference alias online account password in the alias customer profile stored on the second database. Block 114 may also include determining, via the second device, whether the alias answer to the authentication question (e.g., received from the first device) matches or otherwise corresponds to the reference alias answer in the alias customer profile stored on the second database. The method 100 also includes authentication (block 116), via the one or more processors, the user device in response to the alias authentication data corresponding to the reference alias authentication data.

As previously described, for example, with respect to block 102, the alias data may be selected such that it appears to be authentic to a third party user operating a third party device. In this way, a third party user that intercepts or otherwise obtains the alias data may attempt to fraudulently access the online account of the user (e.g., the customer) via the alias data. As described in detail below, the system 10 of FIG. 1. in addition to being employed as outlined above with respect to the method 100 of FIG. 2, may be employed in additional method steps (or another method) to identify an attempt by a third party to fraudulently access the online account of the user (e.g., the customer), block the attempt, and/or leverage the attempt to gain additional information regarding the third party.

For example, FIG. 3 is a process flow diagram illustrating an embodiment of a method 150 of utilizing the system 10 of FIG. 1 to obtain information regarding a third party in response to the third party attempting to fraudulently access an online service (e.g., an online account). It should be noted that the method 150 of FIG. 3 may be combinable with the method 100 of FIG. 2.

In the illustrated embodiment, the method 150 includes presenting (block 152) via one or more processors and on a display of a third party device, a log-in interface to an online account. The method 150 also includes receiving (block 154), via the one or more processors, alias authentication data entered to the log-in interface by the third party device. For example, as previously described, the third party may intercept or otherwise obtain the alias data (as opposed to the true authentication data), and attempt to employ the alias data to fraudulently access the online account. The method 150 also includes identifying (block 156), via the one or more processors and in response to receiving the alias authentication data from the third party device, the attempt to fraudulently access the online account. Indeed, in normal operation, the one or more processors would not receive the alias data from a device attempting to gain access to an online account. In some embodiments, block 156 may include determining that an IP address associated with the third party device is not recognized as belonging to a customer and/or to the intermediate logic.

The method 150 also includes performing (block 158), via the one or more processors, at least one function configured to block the third party device from accessing the online account, obtain additional information from the third party device, or both. For example, the one or more processors may block access to the online account from devices having the IP address corresponding to the third party device. Additionally or alternatively, the one or more processors may enable the third party device to access a false (or shadow) account which appears to be authentic to the third party and is utilized to obtain additional information regarding the third party device or the third party using the third party device. In one embodiment, the third party may be prompted to complete a survey presented on the third party device, where answers to the third party include information regarding the third party or third party device. Additionally or alternatively, the third party may be prompted to activate a camera or microphone of the third party device, which may be employed to obtain additional information regarding the third party. In general, the method 150 is employed to block a third party device from accessing the online account of another and/or leverage the detection of the attempt to fraudulently access the online account to acquire information regarding the third party and/or corresponding third party device.

The above-described systems and methods are merely exemplary, and it should be understood that other systems and methods employing the same or similar techniques are also contemplated by the present disclosure. In general, the disclosed techniques employ alias data that appears to be authentic in an effort to provide, relative to traditional embodiments, improved mechanisms for authenticating (or verifying) a user device requesting access to an online service (e.g., an online account) embodiments. Further, presently disclosed techniques employ the alias data provided, relative to traditional embodiments, improved detection of third party attempts to fraudulently access the online service (e.g., the online account) relative to traditional embodiments.

While only certain features of the present embodiments have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . ." or "step for (perform)ing (a function) . . . ", it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:

1. A computer-implemented method for controlling account access, comprising:

receiving, via processing circuitry and from a user device, authentication data in association with an online account of a plurality of online accounts;

locating, via the processing circuitry, in a database system storing a plurality of customer profiles corresponding to the plurality of online accounts, and based on the authentication data, a customer profile corresponding to the online account;

determining, via the processing circuitry, a correspondence between the authentication data and reference authentication data in the customer profile;

locating, via the processing circuitry, alias authentication data in the customer profile based on determining the correspondence;

locating, via the processing circuitry, in the database system storing a plurality of alias customer profiles corresponding to the plurality of customer profiles, and based on the alias authentication data, an alias customer profile corresponding to the customer profile;

locating, via the processing circuitry and in the alias customer profile, reference alias authentication data;

determining, via the processing circuitry, an additional correspondence between the alias authentication data and the reference alias authentication data;

granting the user device access to the online account based on determining the additional correspondence;

identifying, via the processing circuitry, an attempt by a third party device to fraudulently access the online account in response to receiving, from the third party device, third party device data corresponding to the reference alias authentication data;

blocking, via the processing circuitry, the third party device from accessing the online account in response to identifying the attempt by the third party device to fraudulently access the online account;

permitting, via the processing circuitry, the third party device to access a false account in response to identifying the attempt by the third party device to fraudulently access the online account; and prompting, via the processing circuitry, the third party device to activate a camera or a microphone in response to identifying the attempt by the third party device to fraudulently access the online account.

2. The computer-implemented method of claim 1, comprising:

locating, via the processing circuitry, in the database system, and based on an online account username in the authentication data, the customer profile corresponding to the online account; and determining, via the processing circuitry, the correspondence between:

an online account password or an answer to an online account authentication question in the authentication data; and a reference online account password or a reference answer to the online account authentication question in the reference authentication data.

3. The computer-implemented method of claim 1, comprising:

locating, via the processing circuitry, in the database system, and based on an alias online account username in the alias authentication data, the alias customer profile corresponding to the customer profile; and determining, via the processing circuitry, the additional correspondence between:

an alias online account password or an alias answer to an online account authentication question in the alias authentication data; and a reference alias online account password or a reference alias answer to the online account authentication question in the reference alias authentication data.

4. The computer-implemented method of claim 1, comprising:

presenting, on a display of the third party device and via the processing circuitry, a survey within the false account; and receiving, from the third party device and via the processing circuitry, survey data indicative of answers to the survey.

5. The computer-implemented method of claim 1, wherein the database system includes a first database storing the plurality of customer profiles and a second database storing the plurality of alias customer profiles.

6. The computer-implemented method of claim 1, wherein the processing circuitry includes a first processor configured to determine the correspondence and a second processor configured to determine the additional correspondence.

7. A system, comprising:

a first database storing a plurality of customer profiles corresponding to a plurality of online accounts;

a second database storing a plurality of alias customer profiles corresponding to the plurality of customer profiles;

first processing circuitry configured to:

receive authentication data in association with an online account of the plurality of online accounts, the authentication data including first data indicative of an online account username and second data indicative of an online account password or an answer to an online account authentication question;

locate, in the first database and based on the first data, a customer profile of the plurality of customer profiles;

locate, in the customer profile, third data indicative of a reference online account password or a reference answer to the online account authentication question;

determine a correspondence between the second data and the third data; and locate, in the customer profile and in response to determining the correspondence, alias authentication data including an alias online account username and an alias online account password or an alias answer to the online account authentication question; and second processing circuitry configured to:

receive the alias authentication data from the first processing circuitry;

locate, in the second database and based on the alias online account username, an alias customer profile of the plurality of alias customer profiles, the alias customer profile corresponding to the customer profile;

locate, in the alias customer profile, a reference alias online account password or a reference alias answer to the online account authentication question; and determine an additional correspondence between:

the alias online account password or the alias answer; and the reference alias online account password or the reference alias answer, wherein the first processing circuitry, the second processing circuitry, or both are configured to:

identify an attempt by a third party device to fraudulently access the online account in response to receiving, from the third party device, third party device data corresponding to the alias authentication data;

block the third party device from accessing the online account in response to identifying the attempt by the third party device to fraudulently access the online account;

permit the third party device to access a false account in response to identifying the attempt by the third party device to fraudulently access the online account; and prompt the third party device to activate a camera or a microphone in response to identifying the attempt by the third party device to fraudulently access the online account.

8. The system of claim 7, wherein the first processing circuitry is configured to receive the authentication data from a user device corresponding to a user of the online account.

9. The system of claim 8, wherein the first processing circuitry, the second processing circuitry, or both are configured to permit the user device to access the online account in response to determining the additional correspondence.

10. The system of claim 7, wherein the first processing circuitry, the second processing circuitry, or both are configured to:

present, on a display of the third party device, a survey within the false account; and receive, from the third party device, survey data indicative of answers to the survey.

11. One or more tangible, non-transitory, computer-readable media storing instructions thereon that, when executed by one or more processors, are configured to cause the one or more processors to:

receive, from an electronic device, authentication data including first data indicative of an online account username and second data indicative of an online account password or an answer to an online account authentication question;

locate, in a first database and based on the first data, a customer profile corresponding to the online account;

locate, in the customer profile, third data indicative of a reference online account password or a reference answer to the online account authentication question;

determine a correspondence between the second data and the third data;

locate, in the customer profile and in response to determining the correspondence, alias authentication data including an alias online account username and alias online account password or an alias answer to the online account authentication question;

locate, in a second database and based on the alias online account username, an alias customer profile corresponding to the customer profile;

locate, in the alias customer profile, a reference alias online account password or a reference alias answer to the online account authentication question;

determine an additional correspondence between the alias online account password and the reference alias online account password, or between the alias answer and the reference alias answer;

authenticate the electronic device in response to determining the additional correspondence;

identify an attempt by a third party device to fraudulently access the online account in response to receiving, from the third party device, third party device data corresponding to data stored in the alias customer profile;

block the third party device from accessing the online account in response to identifying the attempt by the third party device to fraudulently access the online account;

permit the third party device to access a false account in response to identifying the attempt by the third party device to fraudulently access the online account; and prompt the third party device to activate a camera or a microphone in response to identifying the attempt by the third party device to fraudulently access the online account.

12. The one or more tangible, non-transitory, computer-readable media of claim 11, wherein the instructions, when executed by the one or more processors, are configured to cause the one or more processors to permit the electronic device to access the online account in response to authenticating the electronic device.

* * * * *